United States Patent [19]

Eastridge et al.

[11] Patent Number: 5,241,670

[45] Date of Patent: Aug. 31, 1993

[54] METHOD AND SYSTEM FOR AUTOMATED BACKUP COPY ORDERING IN A TIME ZERO BACKUP COPY SESSION

[75] Inventors: Lawrence E. Eastridge; Robert F. Kern; Ronald M. Kern, all of Tucson, Ariz.; Claus W. Mikkelsen, Morgan Hill, Calif.; James M. Ratliff, Tucson, Ariz.

[73] Assignee: International Business Machines Corporation, Armonk, N.Y.

[21] Appl. No.: 871,787

[22] Filed: Apr. 20, 1992

[51] Int. Cl.⁵ .............................................. G06T 11/00
[52] U.S. Cl. .................................... 395/575; 395/400
[58] Field of Search ...................... 395/575, 425, 250; 364/260.2, 268.1, 268.2, 282.1

[56] References Cited

U.S. PATENT DOCUMENTS 5,155,835 10/1992 Belsan .................................. 395/425
5,163,131 11/1992 Row et al. .......................... 395/200

Primary Examiner—Vincent P. Canney
Attorney, Agent, or Firm—Andrew J. Dillon; Nancy R. Simon

[57] ABSTRACT

A method in a data processing system for generating a backup copy of designated datasets during concurrent execution of an application. Upon receiving a request for a backup copy, execution of an application is suspended. A dataset logical-to-physical storage system address concordance for the designated datasets is formed, and execution of the application is resumed thereafter. A resource manager is established to manage all input and output functions between storage subsystems, storage subsystem memory associated with each of the storage subsystems, and a temporary host memory during formation of the backup copy. Formation of the backup copy is accomplished on a scheduled or opportunistic basis by copying the designated datasets from the storage subsystems and then updating the address concordance in response to the copying. Application updates are processed during formation of the backup copy by buffering the updates, copying the affected uncopied designated datasets to a storage subsystem memory, updating the address concordance in response to the copying, and processing the updates. Designated datasets can also be copied to the temporary host memory in the event the number of designated datasets in the storage subsystem memory exceeds a threshold number. Finally, the designated datasets are copied to an alternate storage memory from the storage subsystem, storage subsystem memory and temporary host memory utilizing the resource manager and the altered address concordance to create a specified order backup copy of the designated datasets from said copied portions of the designated datasets without user intervention.

16 Claims, 6 Drawing Sheets

METHOD AND SYSTEM FOR AUTOMATED BACKUP COPY ORDERING IN A TIME ZERO BACKUP COPY SESSION

CROSS-REFERENCE TO RELATED APPLICATION

The present application is related to U.S. patent application Ser. No. 07/781,044, entitled Method and Means for Time Zero Backup Copying of Data, filed on Oct. 18, 1991 and assigned to the assignee herein named. The contents of the cross-referenced United States Patent Application is hereby incorporated herein by reference thereto.

BACKGROUND OF THE INVENTION

1. Technical Field

The present invention relates in general to methods and systems for maintaining continued availability of datasets in external storage associated with data processing systems, and in particular to backup copying of records in external storage concurrent with a dramatically shortened suspension of data processing system application execution occasioned by such copying. Still more particularly, the present invention relates to a central system resource manager of all backup copy sessions for the system.

2. Description of the Related Art

A modern data processing system must be prepared to recover, not only from corruptions of stored data which occur as a result of noise bursts, software bugs, media defects, and write path errors, but also from global events, such as data processing system power failure. The most common technique of ensuring the continued availability of data within a data processing system is to create one or more copies of selected datasets within a data processing system and store those copies in a nonvolatile environment. This so-called "backup" process occurs within state-of-the-art external storage systems in modern data processing systems.

Backup policies are implemented as a matter of scheduling. Backup policies have a space and time dimension which is exemplified by a range of datasets and by the frequency of backup occurrence. A FULL backup requires the backup of an entire range of a dataset, whether individual portions of that dataset have been updated or not. An INCREMENTAL backup copies only that portion of the dataset which has been updated since a previous backup, either full or incremental. The backup copy thus created represents a consistent view of the data within the dataset as of the time the copy was created.

Of course, those skilled in the art will appreciate that as a result of the process described above, the higher the backup frequency, the more accurately the backup copy will mirror the current state of data within a dataset. In view of the large volumes of data maintained within a typical state-of-the-art data processing system backing up that data is not a trivial operation. Thus, the opportunity cost of backing up data within a dataset may be quite high on a large multiprocessing, multiprogramming facility, relative to other types of processing.

Applications executed within a central processing system are in either a batch (streamed) or interactive (transactional) mode. In a batch mode, usually one application is executed at a time without interruption. Interactive mode is characterized by interrupt driven multiplicity of applications or transactions.

When a data processing system is in the process of backing up data in a batch mode system, each process, task or application within the data processing system is affected. That is, the processes supporting the batch mode operations are suspended for the duration of the copying. Those skilled in the art will recognize that this event is typically referred to as the "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency described as "fuzzy." That is, the backup copy is not a precise "snapshot" of the state of a dataset/database at a single point in time. Rather, a log comprises an event file requiring further processing against the database.

A co-pending U.S. patent application Ser. No. 07/385,647, filed Jul. 25, 1989, entitled A Computer Based Method for Dataset Copying Using An Incremental Backup Policy, illustrates backup in a batch mode system utilizing a modified incremental policy. A modified incremental policy copies only new data or data updates since the last backup. It should be noted that execution of applications within the data processing system are suspended during copying in this system.

As described above, to establish a prior point of consistency in a log based system, it is necessary to "repeat history" by replaying the log from the last check point over the datasets or database of interest. The distinction between batch mode and log based backup is that the backup copy is consistent and speaks as of the time of its last recordation, whereas the log and database mode require further processing in the event of a fault in order to exhibit a point in time consistency.

U.S. Pat. No. 4,507,751, Gawlick et al., entitled Method and Apparatus For Logging Journal Data Using A Write Ahead Dataset, issued Mar. 25, 1985, exemplifies a transaction management system wherein all transactions are recorded on a log on a write-ahead dataset basis. As described within this patent, a unit of work is first recorded on the backup medium (log) and then written to its external storage address.

Co-pending U.S. patent application Ser. No. 07/524,206, filed May 16, 1990, entitled Method and Apparatus for Executing Critical Disk Access Commands, teaches the performance of media maintenance on selected portions of a tracked cyclic operable magnetic media concurrent with active access to other portions of the storage media. The method described therein requires the phased movement of customer data between a target track to an alternate track, diversion of all concurrent access request to the alternate track or tracks and the completion of maintenance and copy back from the alternate to the target track. Requests and interrupts which occur prior to executing track-to-track customer data movement result in the restarting of the process. Otherwise, request and interrupts occurring during execution of the data movement view a DEVICE BUSY state. This typically causes a re-queuing of the request.

Finally, datasets and/or portions of datasets can be read from multiple locations. Datasets or portions of datasets can be stored in a plurality of direct access storage devices, storage control units, cache memories associated with the storage control units, and a temporary host memory. Those skilled in the art will recognize the limits of channel bandwidth to and from the various devices make it difficult to obtain a precise "snapshot" of the state of the datasets at a single point in time.

Therefore, it should be obvious that a need exists for a method and system for generating a backup copy of designated datasets stored in multiple devices during concurrent execution of an application, wherein the backup copy represents a precise "snapshot" of the state of datasets at a single point in time.

SUMMARY OF THE INVENTION

It is therefore one object of the present invention to provide a method and system for generating a backup copy of a plurality of designated datasets during concurrent execution of an application.

It is another object of the present invention to provide a method and system for coordinating all input/output for the central processing unit and a plurality of storage subsystems and their related devices and a temporary host memory during generation of the backup copy.

It is yet another object of the present invention for the backup copy to represent the designated datasets at a single point in time.

The foregoing objects are achieved as is now described. Upon receiving a request for a backup copy, execution of an application is suspended. A dataset logical-to-physical storage system address concordance for the designated datasets is formed, and execution of the application is resumed thereafter. A resource manager is established to manage all input and output functions between storage subsystems, storage subsystem memory associated with each of the storage subsystems, and a temporary host memory during formation of the backup copy. Formation of the backup copy is accomplished on a scheduled or opportunistic basis by copying the designated datasets from the storage subsystems and then updating the address concordance in response to the copying. Application updates are processed during formation of the backup copy by buffering the updates, copying the affected uncopied designated datasets to a storage subsystem memory, updating the address concordance in response to the copying, and processing the updates. Designated datasets can also be copied to the temporary host memory in the event the number of designated datasets in the storage subsystem memory exceeds a threshold number. Finally, the designated datasets are copied to an alternate storage memory from the storage subsystem, storage subsystem memory and temporary host memory utilizing the resource manager and the altered address concordance to create a specified order backup copy of the designated datasets from said copied portions of the designated datasets without user intervention.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
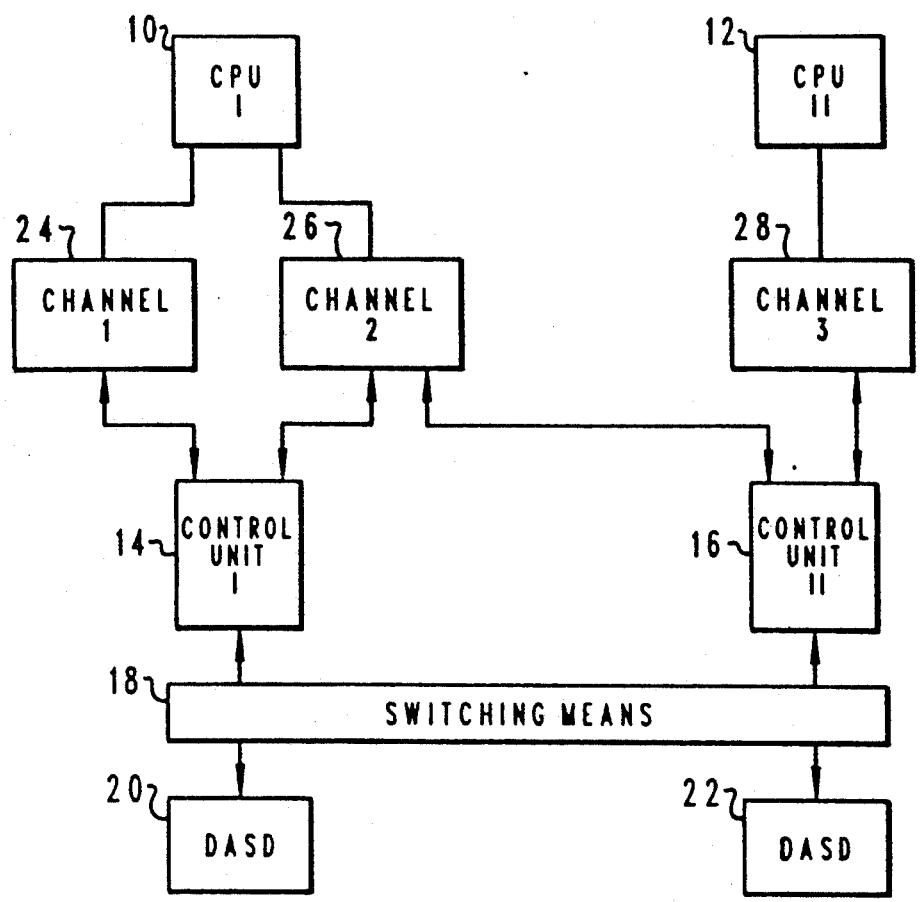
FIG. 1 illustrates a prior art multi-processing multi-programming environment where executing processes and applications randomly or sequentially access data from external storage.

With reference to the figures and in particular with reference to FIG. 1, a prior art multi-processing multi-programming environment is illustrated where executing processes and applications randomly or sequentially access data from external storage. Such systems include a plurality of central processing units 10, 12 which access external storage subsystems 14, 16, 18, 20, 22 over redundant channel demand and response interfaces 24, 26, 28.

The illustrated embodiment in FIG. 1 may be provided in which each processor within the data processing system is implemented utilizing an IBM/360 or 370 architected processor type having, as an example, an IBM MVS operating system. An IBM/360 architected processor is fully described in Amdahl et al., U.S. Pat. No. 3,400,371, entitled Data Processing System, issued on Sep. 3, 1968. A configuration in which multiple processors share access to external storage units is set forth in Luiz et al., U.S. Pat. No. 4,207,609, entitled Path Independent Device Reservation and Reconnection in a Multi-CPU and Shared Device Access System, issued Jan. 10, 1980.

The MVS operating system is also described in IBM Publication GC28-1150, entitled MVS/Extended Architecture System Programming Library: System Macros and Facilities, Vol. 1. Details of standard MVS or other operating system services, such as local lock management, subsystem invocation by interrupt or monitor, and the posting and waiting of tasks is omitted. These operating systems services are believed to be well known to those having skill in this art.

Still referring to FIG. 1, as described in Luiz et al., a processor process may establish a path to externally stored data in an IBM System 370 or similar system through an MVS or other known operating system by invoking a START I/O, transferring control to a channel subsystem which reserves a path to the data over which transfers are made. Typically, executing applications have data dependencies and may briefly suspend operations until a fetch or update has been completed. During such a transfer, the path is locked until the transfer is completed.

Figure 2:
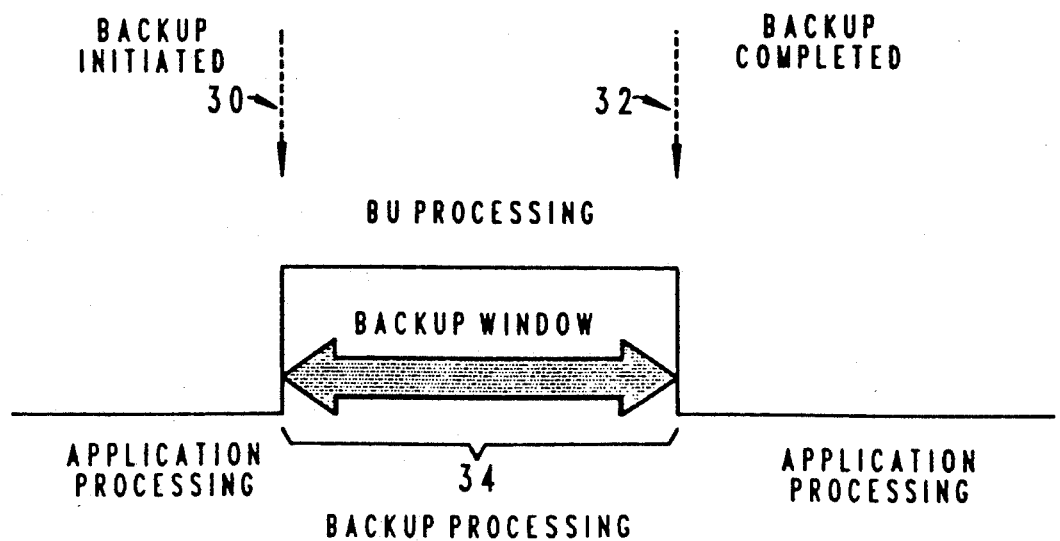
FIG. 2 illustrates a timeline depiction of the backup process according to the prior art.

Referring to FIG. 2, a timeline depiction of the backup process according to the prior art is illustrated. At a first time 30 a backup copy is initiated and applications are suspended or shut down. The suspension continues until the backup copy is completed at a second time 32. Termination of the backup process signifies that all the data specified for backup copy has been read from the source and written to an alternate storage memory. As can be seen, the backup window 34 spans the time from initiation of the backup copy to termination of the backup copy process.

Figure 3:
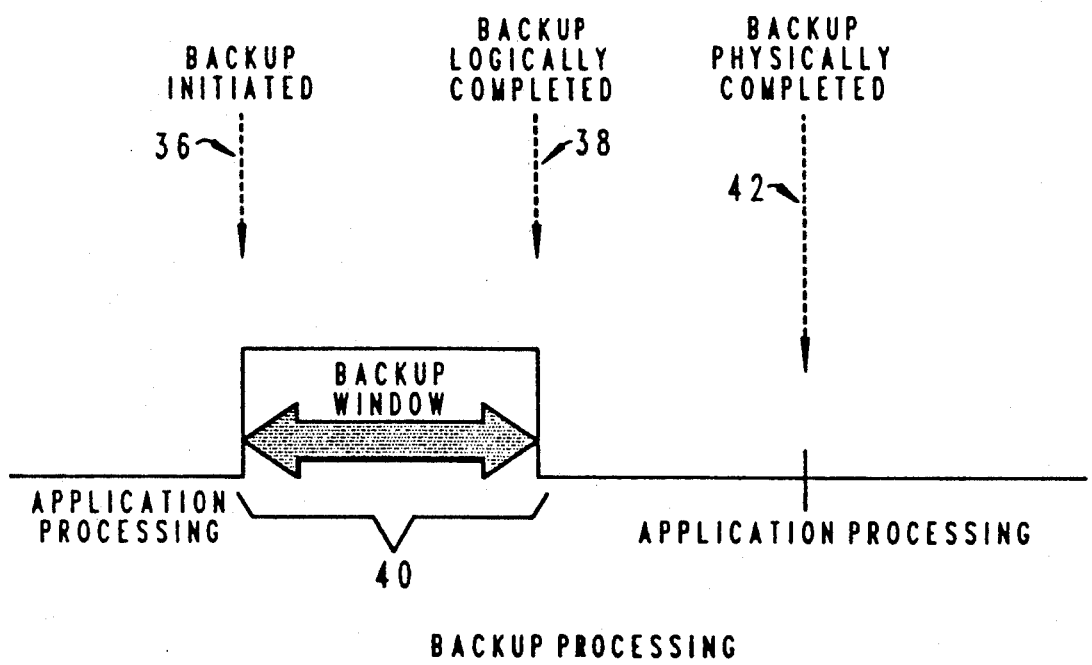
FIG. 3 illustrates a timeline depiction of the backup process according to the present invention.

FIG. 3 illustrates a timeline depiction of the backup process according to the present invention. At a first time 36 the backup copy process is initiated and execution of an application is suspended or shut down. Time 36 is known as "time zero," which means this is the time at which the snapshot of the state of the datasets is taken. As will be described below, the datasets are frozen at that point in time as far as the backup copy process is concerned.

At a second time 38 the backup copy is "logically completed," meaning each track within the datasets to be copied has been identified and mapped in a bitmap, and execution of the application resumes. The datasets can now be used and updated by the application. As can be seen, the backup window 40 is significantly reduced, and is typically measured in milliseconds. Some time later, at a third time 42, the backup copy process is physically completed, meaning all datasets specified for backup copy have been read from the source and written to an alternative storage memory.

Figure 4:
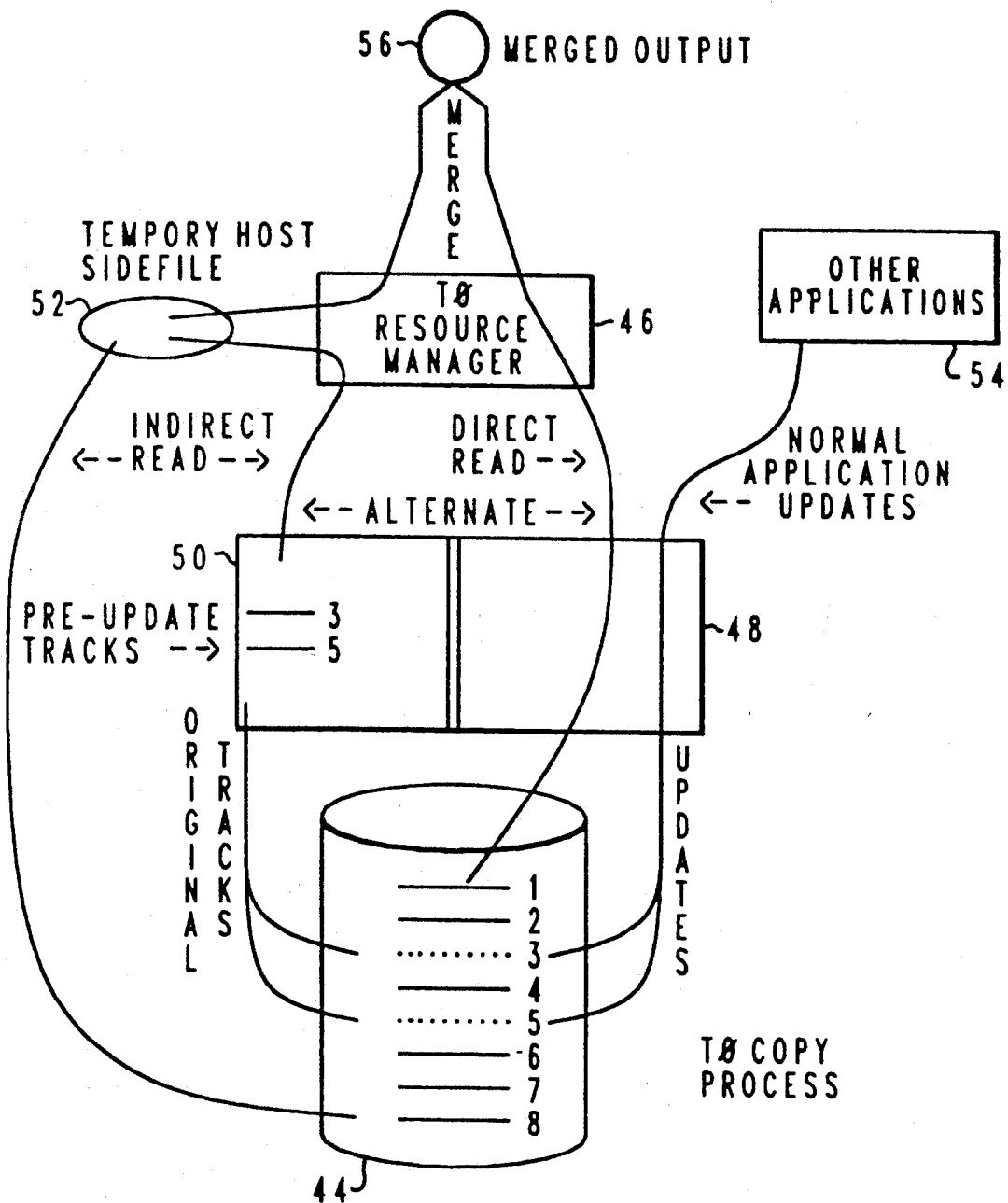
FIG. 4 is a pictorial representation of the method for generating a backup copy according to the present invention.

Referring to FIG. 4, there is depicted a conceptual flow of the creation of a time zero backup copy according to the present invention. As illustrated, a time zero backup copy of data within a tracked cyclic storage device 44 may be created. As those skilled in the art will appreciate, data stored within such a device is typically organized into records and datasets. The real address of data within external storage is generally expressed in terms of Direct Access Storage Device (DASD) volumes, cylinders and tracks. The virtual address of such data is generally couched in terms of base addresses and offsets and/or extents from such base addresses.

Further, a record may be of the count-key-data format. A record may occupy one or more units of real storage. A "dataset" is a logical collection of multiple records which may be stored on contiguous units of real storage or which may be dispersed. Therefore, those skilled in the art will appreciate that if backup copies are created at the dataset level it will be necessary to perform multiple sorts to form inverted indices into real storage. For purposes of explanation of this invention, backup processing will be described as managed both at the resource manager level within a data processing system and at the storage control unit level.

Each processor includes an operating system which includes a T0 resource manager 46. The T0 resource manager 46 is a central resource manager of all T0 copy sessions for the system. Through the T0 resource manager 46 all input/output and session management is coordinated for the processor across all tracked cyclic storage devices 44, storage subsystems 48, storage subsystem memories 50 associated with each storage subsystem 48, and a temporary host memory 52 which may be created within the expanded memory store of a host processor.

As will be described below, the backup copy process includes an initialization period during which datasets are sorted, one or more bit maps are created and logical completion of the bit map is signaled to the invoking process at the processor. The listed or identified datasets are then sorted according to access path elements down to DASD track granularity. Next, bit maps are constructed which correlate the dataset and the access path insofar as any one of them is included or excluded from a given copy session. Lastly, the central processing unit signals logical completion, indicating that updates will be processed against the dataset only after a short delay until such time as physical completion occurs.

Following initialization, each storage subsystem monitors all updates to the dataset. If an update is received from another application 54, storage subsystem 48 will execute a predetermined algorithm to process that update, as described below.

In a time zero backup copy system a determination is first made as to whether or not the update attempted by application 54 is for a volume which is not within the current copy session. If the volume is not within the current copy session, the update completes normally. Alternately, if the update is for a volume which is part of the copy session, the primary session bit map is checked to see if that track is protected. If the corresponding bit within the bit map is off, indicating the track is not currently within a copy session, the update completes normally. However, if the track is protected (the corresponding bit within the bit map is on) the track in question is part of the copy session and has not as yet been read. In such a case, storage subsystem 48 temporarily buffers the update and writes a copy of the affected track from tracked cyclic storage device 44 into a storage subsystem memory 50. Thereafter, the update is permitted to complete.

Thus, as illustrated in FIG. 4, an update initiated by application 54 may be processed through storage subsystem 48 to update data at tracks 3 and 5 within tracked cyclic storage device 44. Prior to permitting the update to occur, tracks 3 and 5 are written to the storage subsystem memory 50 and thereafter, the update is permitted to complete. The primary bit map is then altered to indicate that the copies of tracks 3 and 5, as those tracks existed at the time a backup copy was requested, are no longer within tracked cyclic storage device 44 but now reside within the storage subsystem memory 50.

A merged copy, representing the designated dataset as of the time a backup copy was requested, is then created at reference numeral 56, by copying non-updated tracks directly from tracked cyclic storage device 44, or by indirectly copying those tracks from tracked cyclic storage device 44 to the temporary host memory 52. Additionally, tracks within the dataset which have been written to storage subsystem memory 50 prior to completion of an update may also be indirectly read from the storage subsystem memory 50 to the temporary host memory 52. Those skilled in the art will appreciate that in this manner a copy of a designated dataset may be created from unaltered tracks within tracked cyclic storage device 44, from updated tracks stored within storage subsystem memory 50 and thereafter transferred to temporary host memory 52, wherein these portions of the designated dataset may be merged in backup copy order, utilizing the bit map which was created at the time the backup copy was initiated.

Figure 5A:
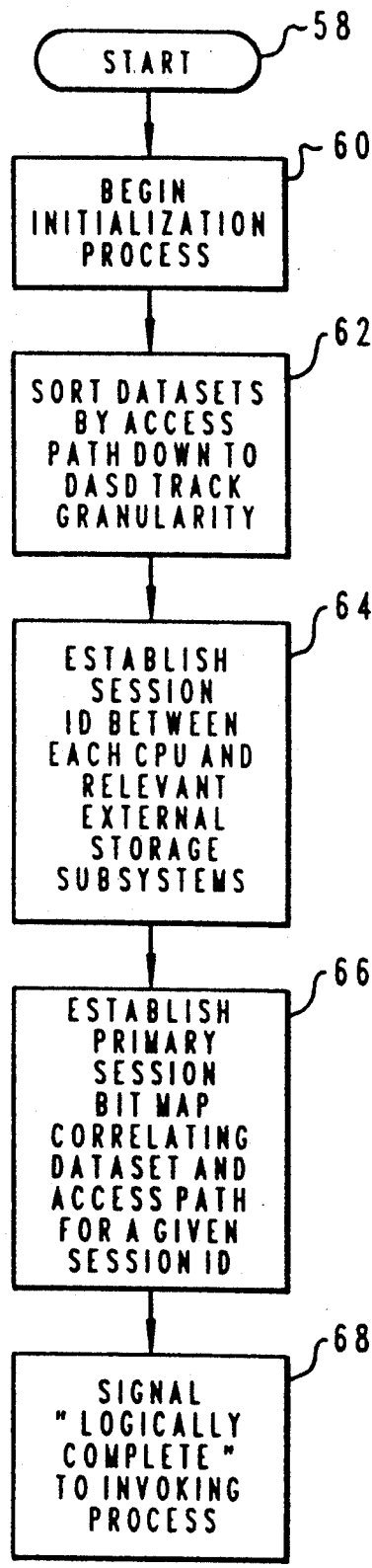
FIGS. 5a-5b are logic flowcharts illustrating the method for generating a backup copy at the storage subsystem level according to the present invention.
Figure 5B:
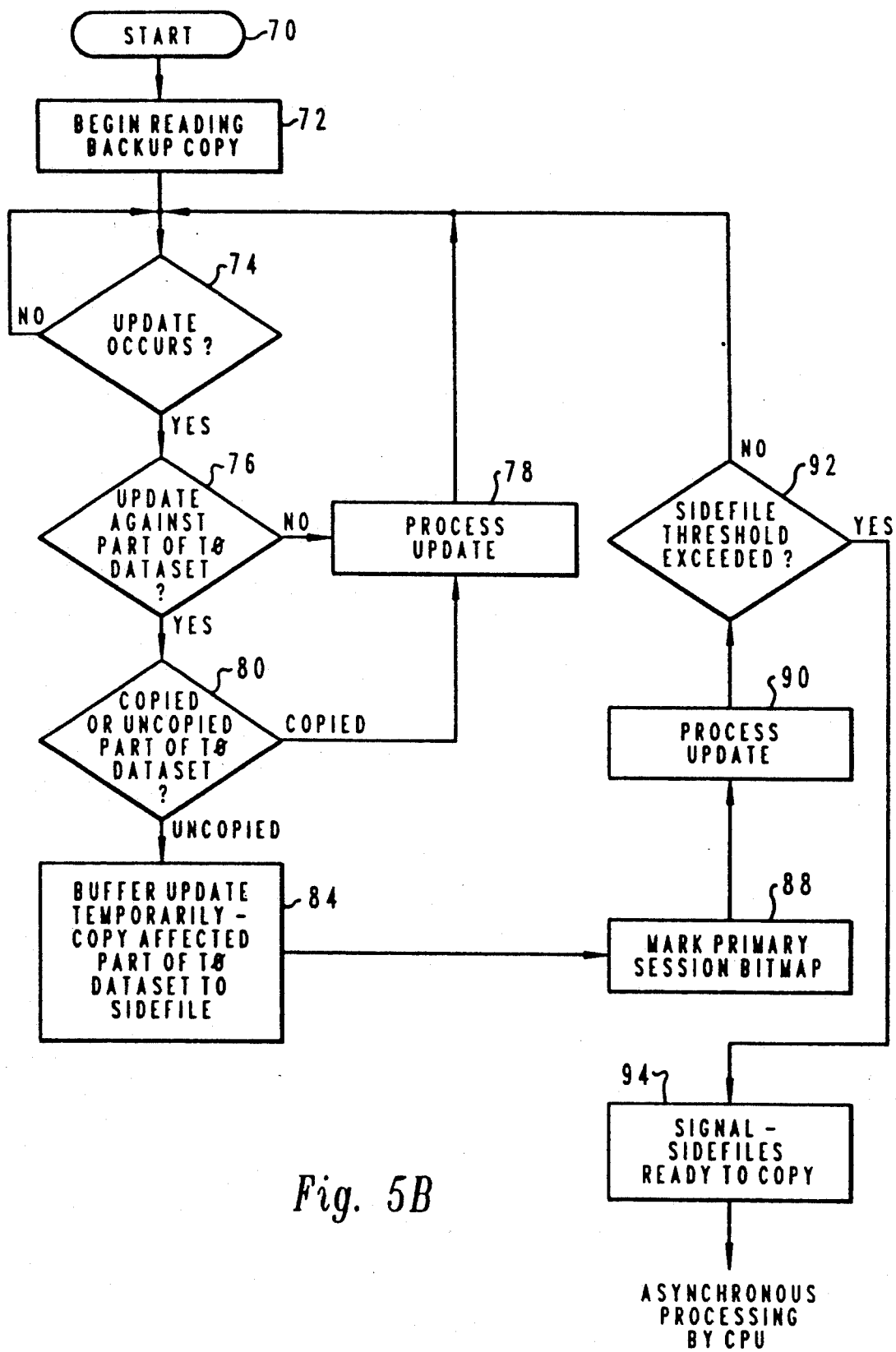

FIGS. 5a-5b are logic flowcharts illustrating the method for generating a backup copy at the storage subsystem level according to the present invention. Referring to FIG. 5a, the process starts at block 58 and thereafter passes to block 60 which illustrates the beginning of the initialization process. Thereafter, the process passes to block 62 which depicts the sorting of the datasets by access path, down to DASD track granularity. This sorting process will, necessarily, resolve an identification of the DASD volumes within which the datasets reside and the identification of the storage subsystems to which those volumes belong.

Next, as depicted at block 64, a session identification is established between each processor and the relevant external storage subsystems. The session identification is preferably unique across all storage subsystems, in order that multiple processors will not interfere with each others' backup copy processes. Thereafter, as illustrated at block 66, a primary session bit map is established which may be utilized, as set forth in detail herein and within the cross-referenced patent application, to indicate whether or not a particular track is part of the present copy session. Thereafter, as depicted at block 68, the "logically complete" signal is sent to the invoking process, indicating that application processing may continue; however, slight delays in updates will occur until such time as the backup copy is physically complete.

Referring to FIG. 5b, which illustrates the method for generating a backup copy at the storage subsystem level according to the present invention, the process begins at block 70 and thereafter passes to block 72. Block 72 depicts the beginning of the reading of a backup copy. Next, block 74 illustrates a determination of whether or not an update has occurred. In the event no update has occurred, the process merely iterates until such time as an update does occur. In the event an update has occurred, the process passes to block 76. Block 76 illustrates a determination of whether or not the update initiated by an application within the data processing system is an update against a portion of the time zero dataset. If not, the process merely passes to block 78 and the update is processed in a user transparent fashion. However, in the event the update is against a portion of the time zero dataset, the process passes to block 80.

Block 80 illustrates a determination of whether or not the update is against a copied or uncopied portion of the time zero dataset. That is, an update to a portion of data within the dataset which has been copied to the backup copy and is therefore physically complete, or a portion which has not yet been copied to the backup copy. If the portion of the dataset against which the update is initiated has already been copied to the backup copy, the process passes to block 78 which illustrate the processing of the update. Again, the process then passes from block 78 to block 74, to await the occurrence of the next update.

Referring again to block 80, in the event the update against the time zero dataset is initiated against a portion of the time zero dataset which has not yet been copied to the backup copy, the process passes to block 84. Block 84 illustrates the temporary buffering of the update and the copying of the affected portion of the time zero dataset to the storage subsystem memory 50 (see FIG. 4). Thereafter, the process passes to block 88, which illustrates the marking of the primary session bit map, indicating to the T0 resource manager 46 that this portion of the dataset has been updated within the external storage subsystem and that the time zero copy of this portion of the dataset is now either within storage subsystem memory 50 or within temporary host memory 52 which is utilized to prevent overflow of data within the storage subsystem memory 50 (see FIG. 4).

After marking the primary session bit map, the process passes to block 90 which illustrates the processing of that update. Thereafter, the process passes to block 92 which depicts a determination of whether or not the threshold within the storage subsystem memory 50 has been exceeded. If so, the process passes to block 94, which illustrates the generation of an attention signal, indicating that portions of datasets within the storage subsystem memory 50 are ready to be copied by the processor. Of course, those skilled in the art will appreciate that a failure to copy data from the storage subsystem memory 50 may result in the corruption of the backup copy if that memory is overwritten. Referring again to block 92, in the event the threshold within the storage subsystem memory 50 has not been exceeded, the process returns again to block 74 to await the occurrence of the next update.

The asynchronous copying of data from a storage subsystem memory 50 to the temporary host memory 52, or to the merged backup copy 56, is described in detail within the cross-referenced patent application, as well as the process by which merged copies are created which incorporate data read directly from storage subsystem 48 and/or data within temporary host memory 52.

Figure 6:
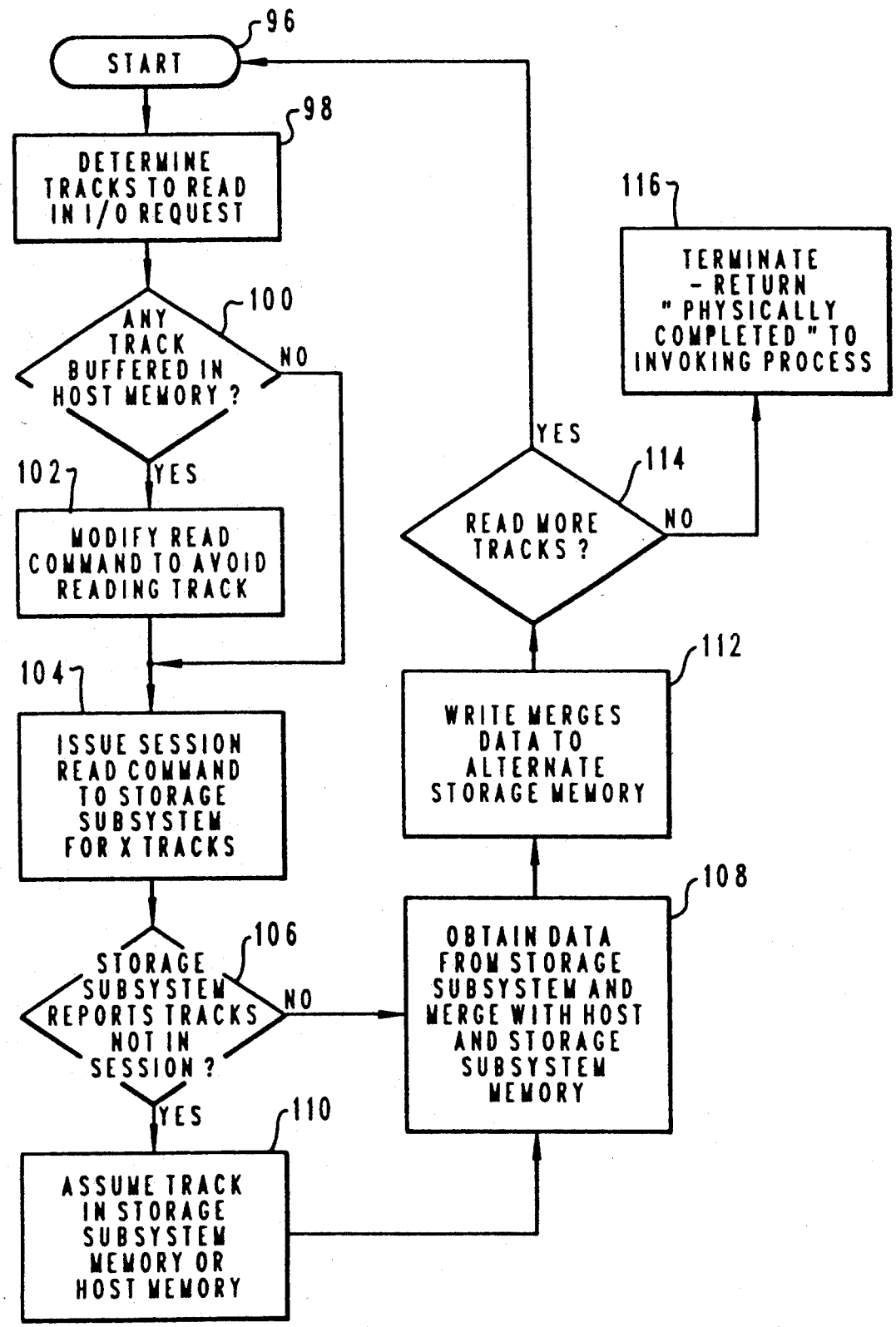
FIG. 6 is a logic flowchart illustrating the method for generating a backup copy at the central processing system level according to the present invention.

FIG. 6 is a logic flow chart illustrating the method for generating a backup copy at the central processing system level according to the present invention. The T0 copy process starts at block 96, and thereafter block 98 determines the tracks to read in the I/O request. It is at this point that the system read command is generated. Block 100 depicts a determination of whether or not a track is initially buffered in the temporary host memory 52. If a track is buffered in the temporary host memory 52, the system read command is modified to avoid reading the track, as shown in block 102. This is done because the track was previously updated and the original track was transferred to the storage subsystem memory 50 and subsequently transferred to the temporary host memory 52. If a track is not buffered in the temporary host memory 52, the process skips block 102 and the track is assumed to exist on the DASD device in an unchanged state.

The process continues at block 104, where a session read command is issued to a storage subsystem 48 for some number of tracks. Block 106 illustrates the storage subsystem reporting some of the tracks are not in the session. This occurs when a session read was attempted on a track not in the session read command. If the storage subsystem 48 indicates a no, the process moves to block 108. If the storage subsystem 48 indicates a yes, the central processing unit operating system assumes the track is in the storage subsystem memory 50 or the temporary host memory 52, as shown in block 110. The track is then recovered from the storage subsystem memory 50 or temporary host memory 52, and the process moves to block 108.

Block 108 illustrates the data obtained from the storage subsystem 48 is merged with any data obtained from the storage subsystem memory 50 and temporary host memory 52. The merged data is then written to an alternate storage memory, as depicted in block 112. Block 114 illustrates a determination of whether or not more tracks need to be read. If yes, the process returns to block 96. If not, block 116 shows the session is terminated with all participating storage subsystems and a "physically completed" is returned to the invoking process. The "physically completed" indicates all data specified for backup copy has been read from the source and written to the alternate storage memory.

The above description of the preferred embodiment describes the present invention in terms of generating a single backup copy. It is possible, however, to utilize the present invention to generate multiple backup copies, with each backup copy being created independently of the other backup copies. In this situation, the T0 resource managers coordinate the creation of each backup copy by utilizing the unique session identifications created for each of the multiple backup copies.

While the invention has been particularly shown and described with reference to a preferred embodiment, it will be understood by those skilled in the art that various changes in form and detail may be made therein without departing from the spirit and scope of the invention.

We claim:

1. A method in a data processing system for generating a backup copy of designated datasets stored within a plurality of storage subsystems during concurrent execution of an application, wherein said data processing system has a temporary host memory associated therewith and each of said storage subsystems has storage subsystem memory associated therewith, said method comprising the steps of:
   responsive to a request for generating said backup copy, suspending execution of said application;
   forming a dataset logical-to-physical storage subsystem address concordance for said designated datasets;
   resuming execution of said application upon completion of said forming said address concordance;
   establishing a resource manager for managing all input and output functions between said plurality of storage subsystems, said storage subsystem memories and said temporary host memory during generation of said backup copy;
   copying portions of said designated datasets on a scheduled or opportunistic basis from said plurality of storage subsystems and updating said address concordance in response to said copying;
   processing any application initiated updates to affected uncopied portions of said designated datasets by buffering said updates, copying said affected uncopied portions of said designated datasets to said storage subsystem memory, updating said address concordance in response to said copying, and writing said updates to said affected portions of said designated datasets within said plurality of storage subsystems; and
   utilizing said resource manager and said altered address concordance to create a specified order backup copy of said designated datasets from said copied portions of said designated datasets without user intervention.

2. The method of claim 1, further comprising the step of copying said designated datasets to said temporary host memory from said storage subsystem memory upon the occurrence of an attention, wherein said attention occurs when a number of uncopied portions of said designated datasets stored in said storage subsystem memory achieves a defined threshold number.

3. The method of claim 1, wherein said step of utilizing said resource manager and said altered address concordance to create a specified order backup copy of said designated datasets from said copied portions of said designated datasets without user intervention comprises copying said designated datasets to an alternate storage memory from said storage subsystem, storage subsystem memory and said temporary host memory utilizing said resource manager and said altered address concordance to create a specified order backup copy of said designated datasets from said copied portions of said designated datasets without user intervention.

4. A method in a data processing system for coordinating a backup copy of designated datasets stored within a plurality of storage subsystems during concurrent execution of an application, wherein said data processing system has a temporary host memory associated therewith and wherein each of said storage subsystems has storage subsystem memory associated therewith, said method comprising the steps of:
   establishing a resource manager for managing all input and output functions between said plurality of storage subsystems, said storage subsystem memories and said temporary host memory during generation of said backup copy;
   creating a session identification and a system read command utilizing said resource manager in response to a request for said backup copy;
   modifying said system read command if any of said designated datasets are initially stored in said temporary host memory;
   forming a dataset logical-to-physical storage subsystem address concordance for said designated datasets at said plurality of storage subsystems in response to said request for said backup copy;
   copying portions of said designated datasets on a scheduled or opportunistic basis from said plurality of storage subsystems and updating said address concordance in response to said copying; and
   processing any application initiated updates to affected uncopied portions of said designated datasets by buffering said updates, copying said affected uncopied portions of said designated datasets to said storage subsystem memory, updating said address concordance in response to said copying, and writing said updates to said affected portions of said designated datasets within said plurality of storage subsystems; and
   utilizing said resource manager and said altered address concordance to create a specified order backup copy of said designated datasets from said copied portions of said designated datasets without user intervention.

5. The method of claim 4, further comprising the step of copying said designated datasets to said temporary host memory from said storage subsystem memory upon the occurrence of an attention, wherein said attention occurs when a number of uncopied portions of said designated datasets stored in said storage subsystem memory achieves a defined threshold number.

6. The method of claim 4, wherein said step of utilizing said resource manager and said altered address concordance to create a specified order backup copy of said designated datasets from said copied portions of said designated datasets without user intervention comprises copying said designated datasets to an alternate storage memory from said storage subsystem, storage subsystem memory and said temporary host memory utilizing said resource manager and said altered address concordance to create a specified order backup copy of said designated datasets from said copied portions of said designated datasets without user intervention.

7. A data processing system for generating a backup copy of designated datasets stored within a plurality of storage subsystems during concurrent execution of an application, wherein said data processing system has a temporary host memory associated therewith and each of said storage subsystems has storage subsystem memory associated therewith, said data processing system comprising:

means for suspending execution of said application in response to a request for said backup copy;

means for forming a dataset logical-to-physical storage subsystem address concordance for said designated datasets;

means for resuming execution of said application upon completion of said forming said address concordance;

means for establishing a resource manager for managing all input and output functions between said plurality of storage subsystems, said storage subsystem memories and said temporary host memory during generation of said backup copy;

means for copying portions of said designated datasets on a scheduled or opportunistic basis from said plurality of storage subsystems and updating said address concordance in response to said copying;

means for processing any application initiated updates to affected uncopied portions of said designated datasets by buffering said updates, copying said affected uncopied portions of said designated datasets to said storage subsystem memory, updating said address concordance in response to said copying, and writing said updates to said affected portions of said designated datasets within said plurality of storage subsystems; and means for utilizing said resource manager and said altered address concordance to create a specified order backup copy of said designated datasets from said copied portions of said designated datasets without user intervention.

8. The data processing system of claim 7, wherein said dataset logical-to-physical storage subsystem address concordance comprises a bitmap.

9. The data processing system of claim 7, wherein said plurality of storage subsystems comprise random access memory.

10. The data processing system of claim 7, wherein said storage subsystem memory comprises cache memory within said storage subsystem.

11. The data processing system of claim 7, further comprising means for copying said designated datasets to said temporary host memory from said storage subsystem memory upon the occurrence of an attention, wherein said attention occurs when a number of uncopied portions of said designated datasets stored in said storage subsystem memory achieves a defined threshold number.

12. A data processing system for coordinating a backup copy of designated datasets stored within a plurality of storage subsystems during concurrent execution of an application, wherein said data processing system has a temporary host memory associated therewith and wherein each of said storage subsystems has storage subsystem memory associated therewith, said data processing system comprising:

means for establishing a resource manager for managing all input and output functions between said plurality of storage subsystems, said storage subsystem memories and said temporary host memory during generation of said backup copy;

means for creating a session identification and a system read command utilizing said resource manager in response to a request for said backup copy;

means for modifying said system read command if any of said designated datasets are initially stored in said temporary host memory;

means for forming a dataset logical-to-physical storage subsystem address concordance for said designated datasets at said plurality of storage subsystems in response to said request for said backup copy;

means for copying portions of said designated datasets on a scheduled or opportunistic basis from said plurality of storage subsystems and updating said address concordance in response to said copying; and means for processing any application initiated updates to affected uncopied portions of said designated datasets by buffering said updates, copying said affected uncopied portions of said designated datasets to said storage subsystem memory, updating said address concordance in response to said copying, and writing said updates to said affected portions of said designated datasets within said plurality of storage subsystems; and means for utilizing said resource manager and said altered address concordance to create a specified order backup copy of said designated datasets from said copied portions of said designated datasets without user intervention.

13. The data processing system of claim 12, wherein said dataset logical-to-physical storage subsystem address concordance comprises a bitmap.

14. The data processing system of claim 12, wherein said plurality of storage subsystems comprise random access memory.

15. The data processing system of claim 12, wherein said storage subsystem memory comprises cache memory within said storage subsystem.

16. The data processing system of claim 12, further comprising means for copying said designated datasets to said temporary host memory from said storage subsystem memory upon the occurrence of an attention, wherein said attention occurs when a number of uncopied portions of said designated datasets stored in said storage subsystem memory achieves a defined threshold number.

* * * * *